United States Patent

[11] 3,557,810

| [72] | Inventor | Charles G. Lomas<br>Wheaton, Md. |
|---|---|---|
| [21] | Appl. No. | 744,526 |
| [22] | Filed | July 12, 1968 |
| [45] | Patented | Jan. 26, 1971 |
| [73] | Assignee | Bowles Engineering Corporation<br>Silver Spring, Md.<br>a corporation of Maryland |

[54] PRESSURE SENSOR AND TACHOMETER
21 Claims, 11 Drawing Figs.

[52] U.S. Cl. .................................................. 137/1, 137/81.5
[51] Int. Cl. .................................................. F15c 1/18
[50] Field of Search .................................. 137/81.5; - 235/201(gen.,p.f.,etc.); 137/1

[56] References Cited
UNITED STATES PATENTS

| 3,314,294 | 4/1967 | Colston | 137/81.5X |
| 3,319,886 | 5/1967 | Phillips | 235/201 p.f. |
| 3,321,955 | 5/1967 | Hatch Jr. | 137/81.5X |
| 3,327,725 | 6/1967 | Hatch Jr. | 137/81.5 |
| 3,339,571 | 9/1967 | Hatch Jr. | 235/201X |
| 3,416,551 | 12/1968 | Kinner | 137/81.5 |
| 3,429,322 | 2/1969 | Metzger | 137/81.5 |

*Primary Examiner*—Samuel Scott
*Attorney*—Hurvitz, Rose & Greene

ABSTRACT: A fluidic pressure sensor utilizes the transition phenomenon of a fluid stream from laminar condition to turbulent condition. A pressure to be measured is applied to two parallel fluid circuits, each comprising a pressure-adjusting valve in series with a coaxial nozzle and receiver. The valves are adjusted so that (1) one of the streams is received quiescently turbulent while the other stream is received quiescently laminar, and (2) the pressures at the receivers are substantially equal. As the input pressure increases from the quiescent condition, the pressure at the receiver of the laminar stream increases substantially linearly while the pressure at the receiver of the turbulent stream decreases substantially linearly in an opposite sense, thereby providing a differential pressure between the receivers which varies linearly in proportion to the input pressure.

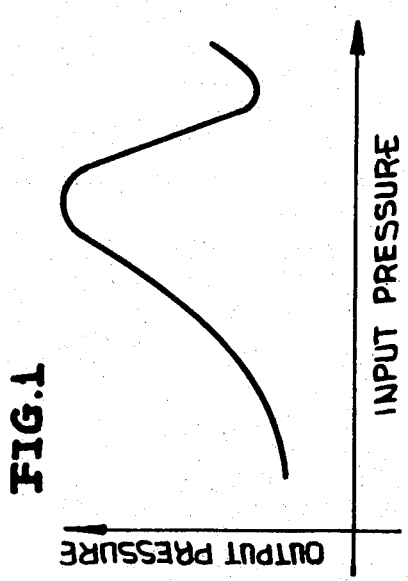
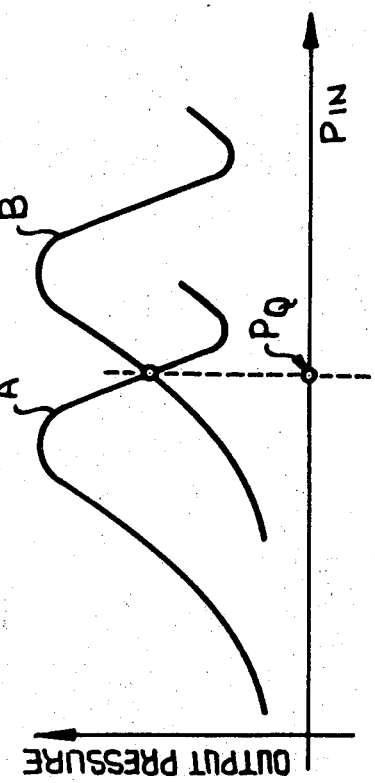
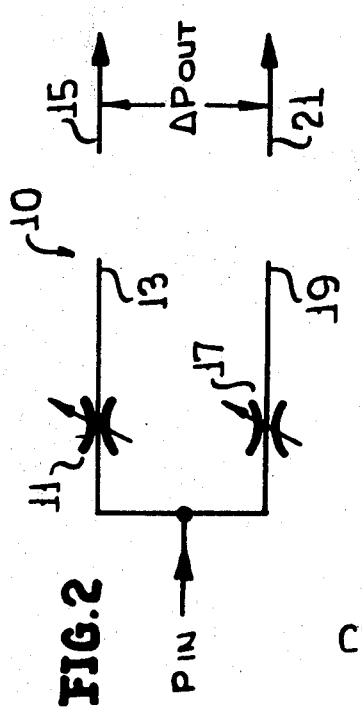
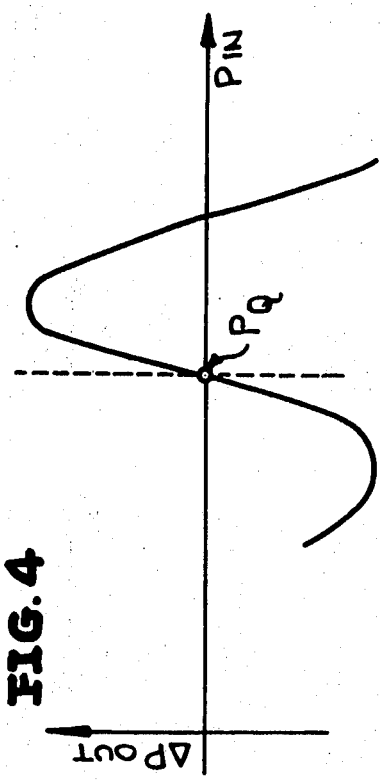
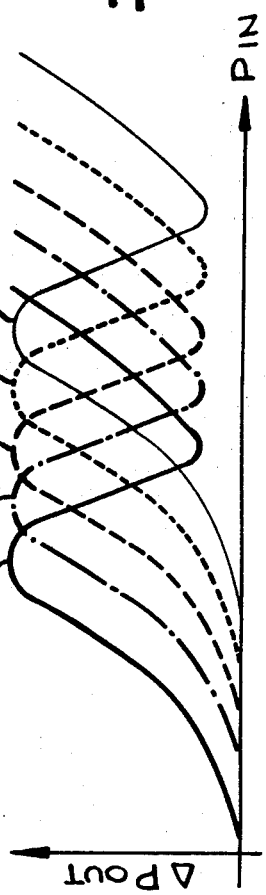
FIG.1
FIG.2
FIG.3
FIG.4
FIG.5
INVENTOR
CHARLES G. LOMAS
BY Hurvitz, Rose & Greene
ATTORNEYS

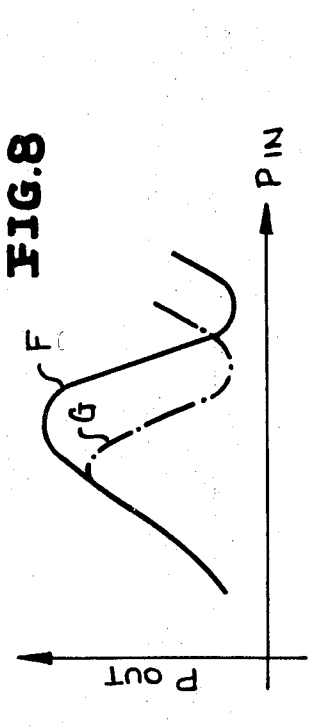
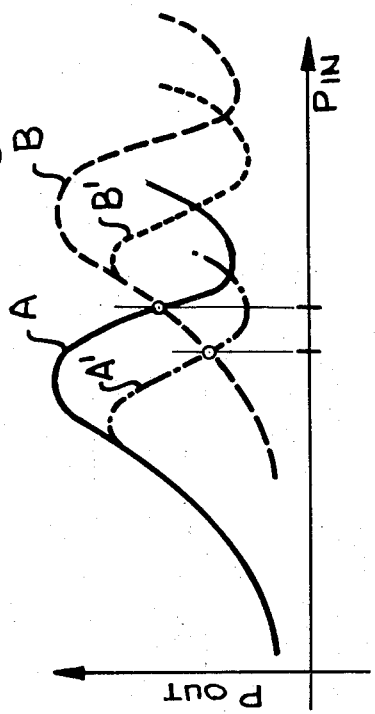
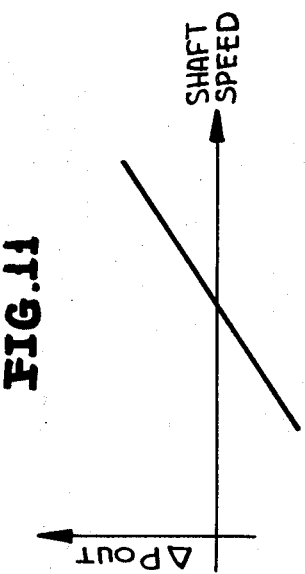
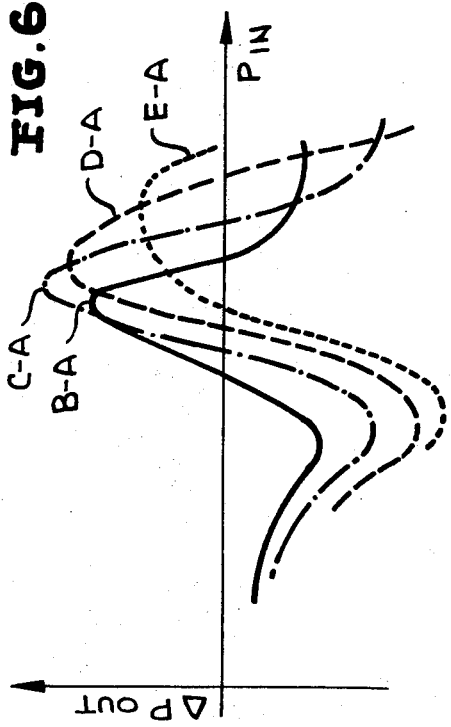
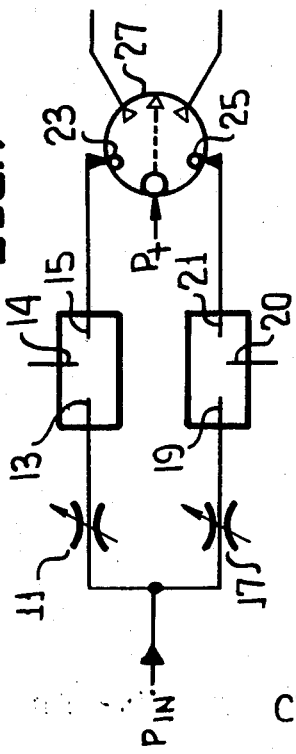
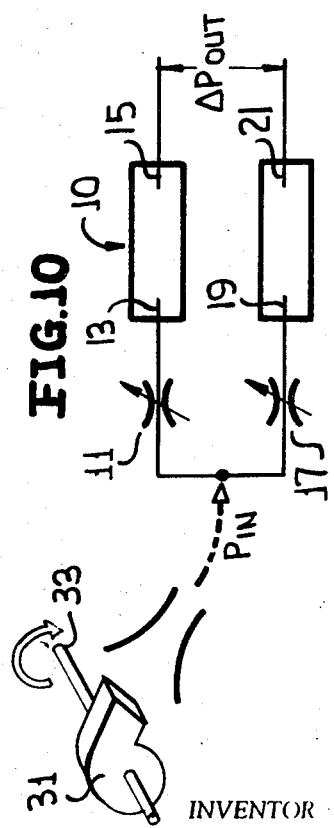
INVENTOR
CHARLES G. LOMAS

3,557,810

PRESSURE SENSOR AND TACHOMETER

BACKGROUND OF THE INVENTION

The present invention relates to fluid pressure sensors and, more particularly, to a fluidic pressure sensor which provides a differential output pressure in response to variations of an input pressure signal.

In various pneumatic and fluidic systems, information signals are usually in the form of variable pressures provided on a single pressure line. In order to be utilizable in the system, the single-line pressure signal must be referenced to a reference pressure; otherwise the pressure variations in the signal are substantially meaningless. If a constant reference pressure is employed for this purpose, it is important that the reference pressure be extremely well regulated, a procedure which is often expensive and which requires a substantial amount of space. A more practical approach is to convert the single-line pressure signal to a pair of differentially varying pressure signals which vary linearly with the input pressure signal. With the advent of fluidics, attempts were made to provide this conversion from single-line to differential pressure signal by utilizing conventional fluidic amplifiers of the proportional stream interaction type. Such amplifiers do provide a differential output signal which varies in proportion to the single-line pressure signal; however, due to small inherent quiescent instability in the amplifier and the nonlinear configuration of the amplifier's power stream velocity profile, it is necessary to provide a well-regulated power stream and bias pressures to the amplifier to minimize quiescent instability and assure amplifier operation on the linear portion of the power stream profile.

In the present invention, the above-described problems associated with prior art pressure sensors are substantially eliminated. This is accomplished by utilizing the phenomenon whereby under certain conditions, a transition between laminar and turbulent flow occurs in a fluid stream. It is well known that a laminar fluid stream issuing from an input nozzle and impinging on an output receiver has an output pressure versus input pressure characteristic substantially the same as that of FIG. 1. More particularly, for low input pressure levels, there is provided an output pressure which increases in correspondence with increasing input pressures up to some predetermined input pressure level. This predetermined input pressure level corresponds to the positive peak output pressure illustrated in FIG. 1. As the input signal approaches this predetermined pressure level, the stream, which heretofore had remained in a condition of laminar flow throughout the distance between the input nozzle and receiver tube, begins to break down into a turbulent state. Further increase in the input power stream pressure renders the stream increasingly turbulent with a corresponding decrease in fluid pressure in the receiver tube. This decrease in pressure is illustrated by the negative sloping portion of the curve in FIG. 1 as a function of increasing input pressure. At some input pressure level, as indicated by the negative peak of the output pressure in FIG. 1, the output pressure begins to rise again in response to input pressure even though the stream remains turbulent.

It is to be noted that the negatively sloping portion of the curve of FIG. 1 (that is, the portion in which the output pressure decreases in response to input pressure increase) is substantially linear throughout most of its length. In addition, a rather large part of the initial positive slope portion of the curve (that is, the low pressure portion of the curve in which the output pressure increases in response to increasing input pressure) is also substantially linear. The present invention makes use of both of these linear portions of the pressure characteristic illustrated in FIG. 1 to provide a differential output pressure varying linearly with a single input pressure.

It is therefore an object of the present invention to provide a pressure sensor wherein a differential output pressure is provided to vary linearly with an input pressure signal.

It is another object of the present invention to provide a pressure sensor which does not require a highly regulated reference pressure.

It is still another object of the present invention to provide a pressure sensor which utilizes the transition of a fluid stream from laminar to turbulent flow.

SUMMARY OF THE PRESENT INVENTION

In accordance with the principles of the present invention, an input pressure signal is applied to two parallel fluid circuits, each of which includes a pressure-adjusting valve and a power stream tube. A fluid receiver is associated with each of the tubes and aligned substantially coaxially therewith to receive substantially all of the respective issued streams, when laminar, and to receive varying portions of the issued streams when turbulent. The pressure adjustment valves are set so that, for a given input pressure, considered herein to be a reference or quiescent condition, one of the issued streams is turbulent and the other of the issued streams is laminar. Furthermore, the adjustments are set such that the receiver tubes of each of the streams receives substantially equal pressures under this quiescent condition. Upon variation of the input pressure from its quiescent condition, the pressures at the two receiving tubes vary substantially linearly and in opposite senses to provide a differential output pressure therebetween which itself varies linearly in response to the input pressure.

The pressure sensor so provided may be utilized as a tachometer when the variable input pressure to the sensor is provided by a blower driven by a rotating shaft. The speed of the rotating shaft is proportional to the output pressure from the blower and hence the differential pressure from the sensor varies linearly with the rotational speed of the shaft.

The input pressure at which either of the two streams begins to become turbulent may be varied by varying the Reynolds number of the stream. The Reynolds number of the stream is dependent upon, interalia, the density, velocity and viscosity of the stream. As will be shown in greater detail hereinbelow, by varying either density or velocity of fluid streams, the quiescent input pressure point may be varied as desired.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein:

FIG. 1 is a plot of the output pressure versus input pressure characteristic of a fluid stream, illustrating the transition region between the laminar and turbulent flow;

FIG. 2 is a schematic representation of the pressure sensor constructed in accordance with the principles of the present invention;

FIG. 3 is a plot of the individual output pressure versus input pressure characteristics appearing at the individual output passages of the circuit of FIG. 2;

FIG. 4 is a plot of the differential output pressure appearing across the output passages of FIG. 2 and obtained by a point-by-point subtraction of the curves illustrated in FIG. 3;

FIG. 5 represents a family of curves, each curve corresponding to an output pressure versus input pressure characteristic appearing at an individual output passage of the circuit of FIG. 2, the curves being obtained by varying the pressure adjustment associated with each of the output passages;

FIG. 6 is a plot of the differential output pressure versus input pressure characteristic of the circuit of FIG. 2, illustrated as a family of curves corresponding to the differences between the curves presented in FIG. 5;

FIG. 7 is a schematic illustration of the pressure sensor of FIG. 2 wherein the output differential pressure is amplified by a conventional fluidic amplifier;

FIG. 8 is a plot of the output pressure versus input pressure characteristic appearing at one of the output passages of the device of FIG. 2, there being provided a illustration as to how the characteristic varies in response to variation of the Reynolds number of the fluid stream;

FIG. 9 is a plot of the output pressure versus input pressure characteristic of a pressure sensor such as that of FIG. 2 wherein it is illustrated how the quiescent pressure point varies in response to variation of the Reynolds number of the power stream fluid;

FIG. 10 is an illustration of a tachometer utilizing the pressure sensor of the present invention; and FIG. 11 is a plot of the output pressure versus shaft speed of the tachometer of FIG. 10.

DESCRIPTION OF THE PREFERRED EMBODIMENTS

Referring now to FIG. 2 of the accompanying drawings, there is illustrated in schematic form a pressure sensor 10 constructed in accordance with the principles of the present invention. An input pressure signal to be measured is applied to two parallel fluid circuit paths. In a first circuit path, the pressure signal is applied to a variable restrictor 11 connected in series with a tube 13. Disposed downstream from and in coaxial alignment with tube 13 is a receiver tube 15. The second parallel circuit comprises a variable restrictor 17 connected in series with a tube 19, and a receiver tube 21 disposed downstream of tube 19 and in substantially coaxial alignment therewith. Tubes 13 and 19 are sufficiently long and smooth-walled to develop laminar flow in the streams issuing therefrom in response to low-pressure level signals applied thereto. The streams issuing from tubes 13 and 19 are directed toward respective receiver tubes 15 and 21, the latter receiving substantially all of the respective streams when the streams are laminar, and receiving varying proportions of the respective streams when turbulent. The curve of FIG. 1 represents the function of the output pressure at tube 15 versus the input pressure at tube 13 as well as representing the function of the output pressure at tube 21 versus input pressure at tube 19. It may be seen for example that for low level input pressures at tube 13, the output pressure increases in response to increasing input pressure, until such point as the stream issuing from tube 13 becomes turbulent, in which case the output pressure begins to decrease as indicated by the negative slope of FIG. 1.

The function of variable restrictors 11 and 17 in FIG. 2 is to selectively adjust the relative pressures appearing at tubes 13 and 19 in response to an input pressure signal $P_{in}$. More particularly, of the fluid flow resistance of the restrictor 11 is increased, thereby dropping the pressure at tube 13 for a given valve of $P_{in}$, the effect is to translate the curve of FIG. 1 to the right and correspondingly, upon decreasing the flow resistance of restrictor 11, thereby increasing the pressure at tube 13 for a given pressure level of $P_{in}$, the curve of FIG. 1 is translated to the left. The overall effect of this is best illustrated in FIG. 3 wherein the output pressure at both of tubes 15 or 21 is plotted as a function of $P_{in}$. More particularly, both curves A and B of FIG. 3 are basically similar in configuration to the curve of FIG. 1 but both represent different values of flow resistance provided by restrictors 11 and 17. Thus, curve A may be considered to represent the output pressure characteristic at output tube 21 for a setting of restrictor 17 which provides relatively low resistance to fluid flow to tube 19; likewise, curve B could represent the output function at receiver tube 15 for a setting of restrictor 11 which provides relatively high resistance to fluid flow through tube 13. Under these conditions, restrictor 11 provides substantially a greater flow resistance to the input signal $P_{in}$ than does restrictor 17. It is seen that the curves A and B intersect at a point lying on the negative sloping portion of curve A and the positive slope portion of curve B. Moreover, the point of intersection between curves A and B occurs in approximately the middle of the substantially linear portion of each of the curves. This point of intersection occurs at a level of signal $P_{in}$ which is referred to as $P_Q$ representing the quiescent input pressure level. More specifically, and as will be better understood from the description which follows, $P_Q$ represents the value of the input signal pressure from which variations are monitored by the pressure sensor illustrated in FIG. 2.

Referring now to FIG. 4 of the accompanying drawings, there is illustrated a plot of the differential pressure signal $\Delta P_{out}$ between output passages 15 and 21 of sensor 10 in FIG. 2 as a function of $P_{in}$. This curve is obtained by subtracting curve A from curve B and FIG. 3 on a point-by-point basis. As illustrated in the curve of FIG. 4, the differential output pressure is zero for an input pressure signal of $P_Q$ and the differential output pressure varies substantially linearly in response to variations in $P_{in}$ from $P_Q$. The linearity of the region in the curve of FIG. 4 surrounding point $P_Q$ is to be expected in view of the fact that point $P_Q$ falls in a linear region of both curves A and B, these linear regions being subtracted from one other to provide the curve of FIG. 4. It is clear then that, if an input pressure is chosen to vary about $P_Q$ in the linear range of the curve of FIG. 4, an accurate output pressure differential as a linear function of $P_{in}$ may be provided.

Referring now to FIG. 5 of the accompanying drawings, there is illustrated a family of curves A, B, C, D and E, curve A representing, for example, the output pressure versus $P_{in}$ at output passage 15 for a given setting of restrictor 11, and four curves B through E representing the output pressure versus $P_{in}$ at output passage 21 for four respective settings of restrictor 17. Each of curves B through E is displaced a successively greater distance to the right of curve A by appropriately increasing the flow resistance through resistor 17. In FIG. 6, four curves, namely b–A, C–A, D–A and E–A, are illustrated representing the pressure differential across output passages 21 and 15 of the circuit of FIG. 2 for each of the respective settings of variable restrictor 17 corresponding to the curves B through E of FIG. 5. The curves in FIG. 6, which are obtained by point-by-point subtraction of the corresponding curves of FIG. 5, provide different output characteristics for the circuit of FIG. 2 as a function of the setting of the restrictor 17. Any of these characteristics may be used in their entirety or only specific portions thereof need be utilized (for example, their linear portions). To limit operation to the linear portion of any of the characteristics of FIG. 6, one may simply limit the range of $P_{in}$ accordingly, or set restrictors 11 and 17 as desired to select the appropriate value of $P_Q$.

Referring now to FIG. 7 of the accompanying drawings, there is illustrated in schematic form the pressure sensor of FIG. 2 in which the output passages 15 and 21 are connected to respective opposed control nozzles 23 and 25 of a conventional proportional fluidic amplifier 27 of the stream interaction type. The purpose of amplifier 27 obviously is to amplify the differential pressure output signal appearing across output passages 15 and 21 when such amplification is desired.

In addition, the circuit illustrated in FIG. 7 differs from that of FIG. 2 in that the tubes 13 and 15 and passages 19 and 21 comprise respective source and receiver tubes for the conventional turbulence amplifiers. The configuration and spacing of tubes 13 and 15 and tubes 19 and 21 require the same considerations in FIG. 7 as in FIG. 2. The turbulence amplifier housing of these tubes provides a more convenient physical relationship and, in addition, provides means for selectively varying the turbulence in the respective streams by means of control nozzle 14 and 20. As is the case with conventional turbulence amplifiers, the control nozzles 14 and 20 are adapted to selectively induce turbulence in the streams issued from tubes 13 and 19, respectively, the degree of turbulence depending upon the strength of a control signal applied to nozzles 14 and 20. It is clear that one may dispense with variable restrictors 11 and 17 if so desired and utilize control nozzles 14 and 20 with appropriate control signals applied thereto to replace the function otherwise provided by restrictors 11 and 17. In the alternative, the restrictors 11 and 17 and the control nozzles 14 and 20 may both be utilized to vary the value of $P_Q$ in FIG. 3. Adjusting the degree of turbulence by introducing control fluid rather by regulating the control valves does tend to be somewhat less accurate since well-regulated control fluid supplies are required. Where such supplies are available, however, as for example in laboratory environments, the control stream biasing technique would be appropriate.

Another consideration to be borne in mind in achieving the desired value of $P_Q$ is the effect of tube diameter on the pressure of fluid flowing within the tube. For example, if tube 13 is narrower than tube 19, tube 13 offers a greater restriction to flow than tube 19. The effect on the output pressure versus input pressure characteristic measured at receiver tubes 15 and 21 is very much similar to the effect produced thereon by varying restrictors 11 and 17 relative to one another. More specifically, narrowing the supply tube (13 or 19) acts to shift the characteristic curve (of FIG. 1 for example) to the right, just as curve B of FIG. 3 is shifted to the right of Curve A. It is readily seen that choice of tube size may be utilized to achieve desired quiescent levels in the sensors of FIGS. 2 and 7.

It is well-known that the Reynolds number of a fluid stream significantly affects the transition from laminar to turbulent flow of the stream. The Reynolds number of the stream may be given by the following expression:

$$R_e = \rho V d / u \qquad (1)$$

where $\rho$ prepresents stream density, V represents stream velocity, d represents the diameter of the supply tubes and u represents absolute viscosity of the fluid stream. The effect of changing the velocity of the fluid stream is achieved by changing the stream pressure and the effect of this on the output pressure versus input pressure characteristic of the circuit of FIG. 2 is illustrated in FIGS. 5 and 6. The following discussion will concern variations in the density and/or absolute viscosity of the fluid stream.

If one changes the Reynolds number of the fluid stream without altering the input pressure $P_{in}$, the output versus input characteristic changes in accordance with the change in curves F and G of FIG. 8. More specifically, curve F corresponds substantially to the curve illustrated in FIG. 1. Curve G represents the same characteristic represented by curve F but wherein the Reynolds number of the stream has been increased. It is seen that by increasing the Reynolds number of the stream, the curve enters its transition region between laminar and turbulent flow at a lower input pressure level. In effect, the overall shape of the curve G remains substantially the same as that of curve F except that the initial positive peak occurs at correspondingly lower input and output pressures; but the linearity of the positive and negative sloping portions remains fairly much the same. Depending on the degree of Reynolds number change, the transition from laminar to turbulent flow can be made at any desired value of input pressure $P_{in}$.

The effect of changing either the absolute viscosity or the density, and thereby the Reynolds number of the fluid streams in the circuit of FIG. 2 is best illustrated in FIG. 9 wherein curves A and B of FIG. 3 are repeated. Assuming either the absolute viscosity or the density of the fluid streams are varied so as to increase the Reynolds number of the streams curves A' and B' illustrate the resultant effect on curves A and B respectively. More particularly, curve A' represents the same function as does curve A, namely the output pressure at tube 21 versus the signal $P_{in}$ except for the fact that the Reynolds number of the stream issued from tube 19 has been increased. Similarly, curve B' represents a Reynolds number increase over the situation detected by curve B. It is seen that as a result of absolute viscosity or density variation resulting in the Reynolds number increase, the point of intersection between curves A' and B' for given restrictor (11, 17) settings occurs at a much lower level of $P_{in}$ than did the intersection of curves A and B. The intersection of curves A' and B' is illustrated as point $P_Q'$ in FIG. 9 whereas the intersection of curves A and B is illustrated as point $P_Q$. It is apparent therefore that the quiescent operating point of the sensor of FIG. 2 may be selectively varied in accordance with the Reynolds number of the fluid employed, an increasing Reynolds number causing a decrease in the quiescent input pressure and a decreasing Reynolds number causing an increase in the quiescent pressure.

Based on the above discussion and on the expression for Reynolds number provided above, it can be shown that the quiescent point pressure varies inversely with pressure and directly with absolute viscosity of the fluid.

Since temperature of the fluid affects both absolute viscosity and density thereof, it is apparent that temperature will also have an effect on the Reynolds number and hence the quiescent operating points of the sensor of FIG. 2. The expression for Reynolds number, in addition to that appearing in equation (1) above, may be written as follows:

$$R_e = V d / v \qquad (2)$$

where $v$ in kinematic viscosity (as ratio of absolute viscosity to density) and V and $d$ are as defined with reference to equation (1). A change in temperature produces a corresponding change in kinematic viscosity. The manner in which kinematic viscosity varies with temperature for different fluids varies in accordance with the particular fluid. In the textbook "Mechanics of Fluids," 1962, page 538, written by I. H. Shames, there is provided a graph illustrating the changes in kinematic viscosity with temperature of the various fluids. It can be shown from this graph that the quiescent point input pressure for the circuit of FIG. 2 varies inversely with temperature for such working fluids as crude oil, kerosene, gasoline, water and mercury and varies directly with temperature for gases such as helium, hydrogen, air, oxygen and carbon dioxide.

Referring now specifically to FIG. 10 of the accompanying drawings, there is illustrated the pressure sensor 10 of FIG. 2 utilized as a tachometer. More specifically, the input pressure $P_{in}$ for pressure sensor 10 as utilized in FIG. 10 is derived from a blower 31. The blower 31 is driven by a rotating shaft 33, the rotational speed of which is to be monitored by the pressure sensor 10. If the output pressure from blower 31 is linearly variable with the speed of shaft 33, the input pressure signal $P_{in}$ is linearly variable with the speed of shaft 33. Since the differential output pressure appearing across output tubes 15 and 21 of sensor 10 is linearly proportional to signal $P_{in}$, the differential output pressure is therefore linearly proportional to the speed of the shaft 33. This relationship is illustrated in FIG. 11 which is a plot of the differential output pressure between receivers 15 and 21 versus the speed of shaft 33. Only the linear portion of the curve of FIG. 4 is illustrated in FIG. 10, the linear output versus input function is desired. FIG. 10 therefore illustrates a tachometer application for the pressure sensor of FIG. 2.

While I have described and illustrated one specific embodiment of my invention, it will be clear that variations of the details of construction which are specifically illustrated and described may be resorted to without departing from the true spirit and scope of the invention in the appended claims.

I claim:
1. A fluidic pressure sensor for providing an output differential pressure as a function of a variable pressure input signal comprising:
   first and second nozzle means responsive to application of pressurized fluid thereto for issuing respective first and second fluid streams;
   means for applying said variable pressure input signal to said first and second nozzle means;
   a first receiving means located downstream of said first nozzle means and directed toward said first nozzle means for receiving at least a portion of said first fluid stream, the position of said first receiver means relative to said first nozzle means being such that the portion of said first fluid stream received by said first receiving means is laminar whenever the pressure of said input signal is below a first predetermined transition pressure and the portion of said first fluid stream received by said first receiving means is turbulent whenever the pressure of said input signal is above said first predetermined transition pressure;

second receiving means located downstream of and directed toward said second nozzle means for receiving at least a portion of said second fluid stream, the position of said second receiver means relative to said second nozzle means being such that the portion of said second fluid stream received by said second receiving means is laminar whenever the pressure of said input signal is below a second predetermined transition pressure different from said first transition pressure, and the portion of said second fluid stream received by said second receiving means is turbulent whenever the pressure of said input signal is greater than said second predetermined transition pressure; and wherein said output differential pressure is a difference in pressures between the fluid received by said first and second receiving means.

2. The combination according to claim 1 wherein is further provided first flow restriction means connected in series between said means for applying said variable input pressure signal and said first nozzle means, and second flow restriction means connected in series between said means for applying said variable pressure input signal and said second nozzle means, said first and second flow restriction means comprising different flow restriction.

3. The combination according to claim 1 further comprising a pure fluid amplifier means for amplifying said differential output pressure.

4. The combination according to claim 1 wherein said first predetermined transition pressure is lower than said second predetermined transition pressure, and wherein for increasing input signal pressures in the range between said first and second predetermined transition pressures the pressure of the fluid received by said first receiving means from said first fluid stream decreases substantially linearly and the pressure of the fluid received by said second receiving means from said second fluid stream increases substantially linearly.

5. The combination according to claim 4 further comprising:
a rotating member, and
variable speed blower means adapted to be driven by said rotating member for providing said variable pressure input signal as a function of the speed of said rotating member whereby said output differential pressure is a function of the speed of said rotating member.

6. The combination according to claim 1 further comprising the means for selectively changing at least one of said first and second predetermined transition pressures.

7. The combination according to claim 6 wherein said first and second receiving means are disposed coaxially with respect to said first and second nozzle means respectively.

8. The combination according to claim 7 wherein said first and second receiving means have respective ingress orifices of such size to receive substantially all of said first and second fluid streams respectively whenever said first and second fluid streams are laminar.

9. The combination according to claim 6 wherein said means for selectively changing comprises first control means for issuing a control stream of fluid in interacting relationship with at least one of said first and second fluid streams and at a first selectable pressure within a first range of pressures such that the degree of turbulence of said at least one fluid stream is varied in accordance with said selectable pressure and said at least one fluid stream remains in a substantially undeflected state over said first range of pressures.

10. The combination according to claim 9 wherein said at least one of said fluid streams corresponds to said first fluid stream and further comprising further control means for issuing a second control stream in interacting relationship with said second fluid stream and at a second selectable pressure within a second range of pressures such that the degree of turbulence in said second fluid stream is varied in accordance with said second selectable pressure and said second fluid stream remains in a substantially undeflected state over said second range of pressures.

11. The combination according to claim 6 wherein said means for selectively changing comprises first selectively variable flow restriction means connected in series between said means for applying said variable pressure input signal and one of said first and second nozzle means.

12. The combination according to claim 11 wherein said one of said nozzle means corresponds to said first nozzle means and further comprising second selectively variable flow restriction means connected in series between said means for applying said variable pressure nozzle signal and said second nozzle means.

13. A fluidic pressure sensor for providing an output differential pressure as a predetermined function of a variable pressure input signal, said pressure sensor comprising:
a first nozzle adapted to issue a stream of fluid in response to application of pressurized fluid thereto;
means for applying said input signal to said first nozzle;
first fluid receiver means for receiving at least a portion of said first stream, the pressure of the fluid thus received varying as a first function of the pressure of said signal;
a second nozzle adapted to issue a stream of fluid in response to application of pressurized fluid thereto;
means for applying said input signal to said second nozzle;
a second fluid receiver means for receiving at least a portion of said second fluid stream, the pressure of the fluid thus received varying as a second function of the pressure of said input signal, said second function differing from said first function; and
wherein said output differential pressure is the pressure difference between the fluid received by said first and second receiving means, and whereby said predetermined function is the difference between said first and second functions of said input signal.

14. The combination according to claim 13 further comprising means for selectively changing at least one of said first and second functions.

15. The combination according to claim 14 wherein said last-mentioned means comprises variable flow restriction means connected in series between said means for applying said input signal to said first nozzle and said first nozzle.

16. The combination according to claim 14 wherein said last-mentioned means comprises control means for issuing a control stream of fluid in interacting relationship with at least one of said streams of fluid such that the degree of turbulence of said stream of fluid is varied in accordance with said control stream and such that said fluid stream remains substantially undeflected.

17. A fluidic pressure sensor for providing an output differential pressure as a function of a variable-pressure input signal, said sensor comprising:
first means responsive to said variable-pressure input signal for providing a first fluid stream having a pressure which is a function of said variable-pressure input signal, and such that the state of said first fluid stream at a first specified downstream location is laminar whenever the pressure of said variable-pressure input signal is below a first predetermined pressure and turbulent whenever the pressure of said variable-pressure input signal is above said first predetermined pressure;
second means responsive to said variable-pressure input signal for providing a second fluid stream having a pressure which is a function of said variable-pressure input signal, and such that the state of said second fluid stream at a second specified downstream location is laminar whenever the pressure of said variable-pressure input signal is below a second predetermined pressure and turbulent whenever the pressure of said variable-pressure input signal is above said second predetermined pressure;
wherein said first and second predetermined pressures are different;
first receiver means for receiving at least a portion of said first fluid stream at said first specified downstream location, said first receiver means being arranged to receive a greater portion of said first fluid stream when the latter is laminar than when the latter is turbulent;

second receiver means for receiving at least a portion of said second fluid stream at said second specified downstream location, said receiver means being arranged to receive a greater portion of said second fluid stream when the latter is laminar than when the latter is turbulent; and wherein said output differential pressure is the pressure difference between the portions of said first and second fluid streams received by said first and second receiver means respectively.

18. The sensor according to claim 17 wherein said first predetermined pressure is lower than said second predetermined pressure; wherein the pressure of the portion of said first fluid stream received by said first receiver means varies inversely with the pressure of said variable-pressure input signal over at least part of the range of pressures between said first and second predetermined pressure; and wherein the pressure of the portion of said second fluid stream received by said second receiver means varies directly with the pressure of said variable pressure input signal over at least said part of the range of pressures between said first and second predetermined pressures.

19. The sensor according to claim 18 further comprising means for selectively changing at least one of said first and second predetermined pressures.

20. The sensor according to claim 18 wherein said first and second means each include a nozzle from which the respective first and second fluid streams are issued, and wherein said first and second reciever means include respective first and second tubes disposed coaxially with and downstream of a respective nozzle.

21. The method of converting a variable-pressure input signal into a correspondingly variable differential pressure, said method comprising the steps of:

converting said variable-pressure input signal into two fluid streams, one of which becomes turbulent above a first predetermined pressure of said input signal, the other of which becomes turbulent above a second predetermined pressure of said input signal, said second predetermined pressure being higher than said first predetermined pressure;

receiving a relatively large portion of said first fluid stream when laminar and a relatively small portion when turbulent;

receiving a relatively large portion of said second fluid stream when laminar and a relatively small portion when turbulent; and providing said differential pressure from the received portions of said first and second fluid streams when said variable-pressure input signal lies in the range of pressures between said first and second predetermined pressures.